United States Patent
Kuppan et al.

(10) Patent No.: US 10,920,794 B2
(45) Date of Patent: Feb. 16, 2021

(54) ASPIRATOR WITH SECONDARY INLETS

(71) Applicant: GOODRICH CORPORATION, Charlotte, NC (US)

(72) Inventors: Skandan Berikai Kuppan, Bangalore (IN); Satya Swaroop Panda, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 73 days.

(21) Appl. No.: 16/207,740

(22) Filed: Dec. 3, 2018

(65) Prior Publication Data

US 2020/0124057 A1  Apr. 23, 2020

(51) Int. Cl.
| | |
|---|---|
| *F04F 5/46* | (2006.01) |
| *F04F 5/16* | (2006.01) |
| *B64D 25/14* | (2006.01) |
| *B64D 25/18* | (2006.01) |

(52) U.S. Cl.
CPC ............... *F04F 5/466* (2013.01); *F04F 5/16* (2013.01); *F04F 5/463* (2013.01); *B64D 25/14* (2013.01); *B64D 25/18* (2013.01)

(58) Field of Classification Search
CPC ........ F04F 5/00; F04F 5/14; F04F 5/16; F04F 5/46; F04F 5/463; F04F 5/466; B64C 1/34; B64C 25/56
USPC .................................................. 417/151, 179
See application file for complete search history.

(56) References Cited

U.S. PATENT DOCUMENTS

| | | | |
|---|---|---|---|
| 3,460,746 A | | 8/1969 | Green et al. |
| 3,791,764 A | * | 2/1974 | Summer .................. F04F 5/18 417/185 |
| 4,368,009 A | * | 1/1983 | Heimovics, Jr. ...... B61B 12/005 417/179 |
| 4,487,553 A | * | 12/1984 | Nagata .................... F04F 5/466 261/76 |
| 8,974,272 B2 | | 3/2015 | Mornan et al. |
| 2018/0186461 A1 | | 7/2018 | Haynes et al. |

FOREIGN PATENT DOCUMENTS

CN  206745056 U  * 12/2017  ............... F04F 5/16

* cited by examiner

*Primary Examiner* — Philip E Stimpert
(74) *Attorney, Agent, or Firm* — Snell & Wilmer L.L.P.

(57) ABSTRACT

An aspirator may include an aspirator body comprising an outer wall and an inner wall, the inner wall defining a body channel. The aspirator may include an aspirator body including an outer wall and an inner wall, the inner wall defining a body channel. The aspirator body may include a plenum disposed between the outer wall and the inner wall. The aspirator body may include a plurality of apertures disposed between the outer wall and the inner wall and defined by a side wall and the plenum. The aspirator may include an aspirator barrel comprising a barrel outer wall and a barrel inner wall, the barrel inner wall defining an air channel. The air channel may be in fluid communication with the plenum.

19 Claims, 7 Drawing Sheets

ASPIRATOR WITH SECONDARY INLETS

CROSS REFERENCE TO RELATED APPLICATIONS

This application claims priority to and the benefit of Indian Patent Application No. 201811039808, filed Oct. 22, 2018 and entitled "ASPIRATOR WITH SECONDARY INLETS," which is incorporated by reference herein in its entirety for all purposes.

FIELD

The present disclosure is directed to evacuation systems for use in aircraft and, more particularly, to aspirators for inflating evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and an aspirator. The aspirator, working with the compressed fluid source, combines ambient air from the atmosphere and the fluid to provide gas for inflating the emergency evacuation devices. Aspirator's efficiency may be measured by the ratio of ambient air to compressed fluid directed through the aspirator. The position of the aspirator nozzle and the shape of the aspirator may affect the efficiency of the aspirator.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

In various embodiments, an aspirator is provided. In various embodiments, an aspirator may include an aspirator body comprising an outer wall and an inner wall, the inner wall defining a body channel. The aspirator may include an aspirator body including an outer wall and an inner wall, the inner wall defining a body channel. The aspirator body may include a plenum disposed between the outer wall and the inner wall. The aspirator body may include a plurality of apertures disposed between the outer wall and the inner wall and defined by a side wall and the plenum. The aspirator may include an aspirator barrel comprising a barrel outer wall and a barrel inner wall, the barrel inner wall defining an air channel. The air channel may be in fluid communication with the plenum. In various embodiments, the aspirator may include a first bridge connecting the aspirator body to the aspirator barrel. In various embodiments, a width of the body channel is less than a width of the air channel at a first end of the aspirator barrel. In various embodiments, the aspirator may include a first secondary inlet disposed between the outer wall of the aspirator body and the barrel inner wall, wherein a first secondary inlet is in fluid communication with the air channel. In various embodiments, the aspirator body may have at least one of a quadrilateral, circular, or triangular cross section. In various embodiments, an inflatable evacuation device may be coupled with a second end of the aspirator barrel. In various embodiments, the width of the body channel may be between about 2 inches and about 4.5 inches. In various embodiments, the width of the air channel at a first end of the aspirator barrel may be between about 3 inches and about 12 inches. In various embodiments, a width of the air channel at a second end of the aspirator barrel may be between about 2 inches and about 4.5 inches. In various embodiments, the aspirator may include a second secondary inlet disposed between the outer wall of the aspirator body and the barrel inner wall, wherein the second secondary inlet is in fluid communication with the air channel.

In various embodiments, aircraft having an evacuation system. In various embodiments, the aircraft may include an aspirator coupled to an inflatable evacuation device. In various embodiments, the aircraft may include a compressed fluid source coupled to the aspirator via a pipe assembly. In various embodiments, the aspirator may include an aspirator body comprising an outer wall and an inner wall, the inner wall defining a body channel. In various embodiments, the aspirator may include an aspirator barrel comprising a barrel outer wall and a barrel inner wall, the barrel inner wall defining an air channel. In various embodiments, the aspirator may include a first bridge connecting the aspirator body to the aspirator barrel. In various embodiments, the aspirator may include a first secondary inlet disposed between the outer wall of the aspirator body and the barrel inner wall, wherein the first secondary inlet is in fluid communication with the air channel In various embodiments, a width of the body channel is less than a width of the air channel at a first end of the aspirator barrel. In various embodiments, the aspirator may include a plenum disposed between the outer wall and the inner wall, wherein the aspirator body comprises a plurality of apertures disposed between the outer wall and the inner wall and defined by a side wall and the plenum. In various embodiments, an aspirator body may have at least one of a quadrilateral, circular, or triangular cross section. In various embodiments, the aspirator body may include a second secondary inlet disposed between the outer wall of the aspirator body and the barrel inner wall, wherein the second secondary inlet is in fluid communication with the air channel. In various embodiments, the aspirator body may include a third secondary inlet disposed between the outer wall of the aspirator body and the barrel inner wall, wherein the third secondary inlet is in fluid communication with the air channel. In various embodiments, the width of the body channel may be between about 2 inches and about 4.5 inches. In various embodiments, the width of the air channel at a first end of the aspirator barrel may be between about 3 inches and about 12 inches.

In various embodiments, an aspirator method is provided. The method may include coupling an aspirator body to an aspirator barrel via a first bridge. The method may include coupling an aspirator gas nozzle to the aspirator body. The method may include coupling a compressed fluid source to the aspirator gas nozzle via a pipe assembly. The method may include coupling the aspirator barrel to an inflatable evacuation device. The method may include coupling the aspirator body to the aspirator barrel via a second bridge. The method may include coupling the aspirator body to the aspirator barrel via a third bridge and a fourth bridge.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "distal" refers to the direction toward the positive z-direction on the provided xyz axes relative to aspirator 114. As used herein, "proximal" refers to a direction toward the negative z-direction on the provided xyz axes relative to aspirator 114.

Figure 1:
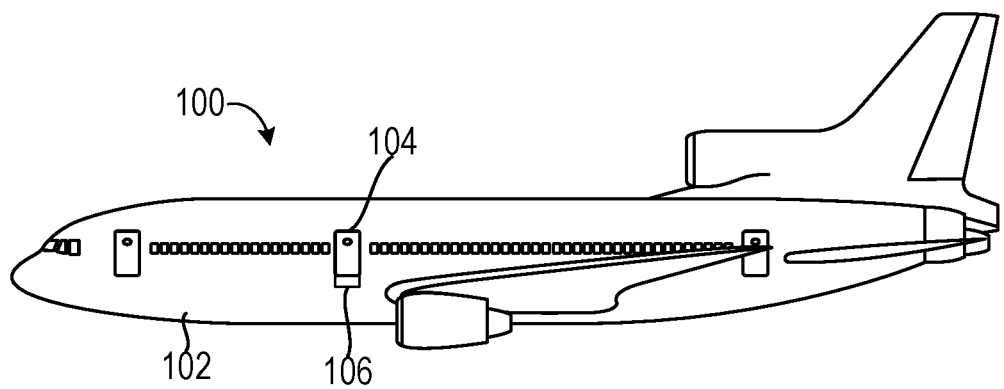
FIG. 1 illustrates a perspective view of an aircraft having an evacuation system, in accordance with various embodiments.

Referring to FIG. 1, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever.

Figure 2:
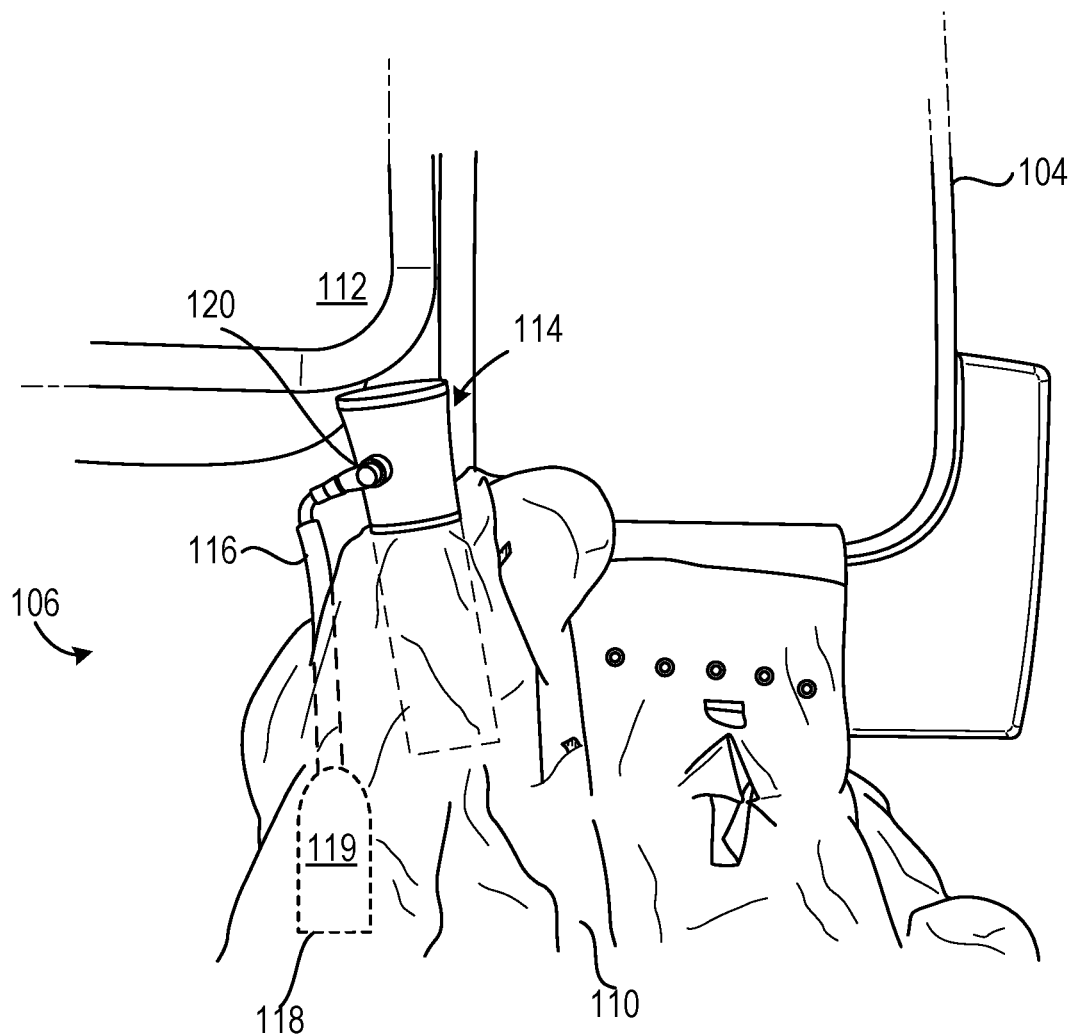
FIG. 2 illustrates an evacuation system, in accordance with various embodiments.

Referring to FIGS. 1 and 2, evacuation system 106 includes an inflatable evacuation device 110. Evacuation system 106 further includes ambient gas 112. The ambient gas 112 may enter the inflatable evacuation device 110 to inflate the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1.

In various embodiments, and referring to FIG. 2, the aspirator 114 may be coupled to the inflatable evacuation device 110 and pipe assembly 116. A compressed fluid source 118 may be coupled to the pipe assembly 116. Pipe assembly 116 may be coupled to the aspirator 114 via an aspirator gas valve 120. During normal flight conditions, the inflatable evacuation device 110 may be deflated and stored within a compartment of aircraft 100. In various embodiments, inflatable evacuation device 110 and aspirator 114 may be stored in a single package within the aircraft compartment. When inflatable evacuation device 110 is not in use, it may be deflated when packed. In response to deployment of the evacuation system 106, fluid 119 may flow from compressed fluid source 118 into aspirator gas valve 120 via pipe assembly 116 at a relatively high velocity.

Figure 3:
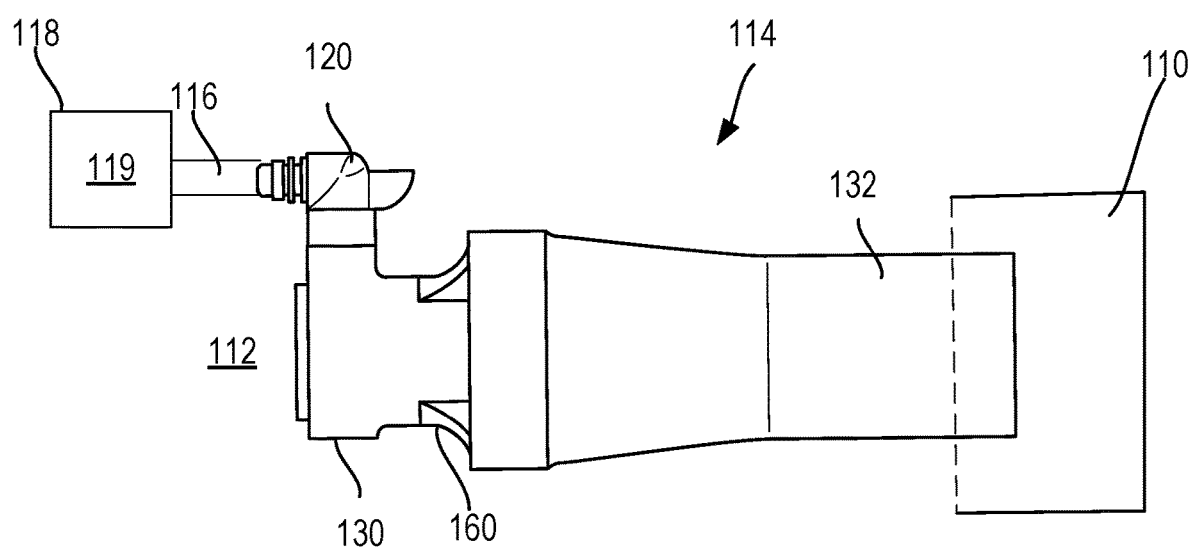
FIG. 3 illustrates an aspirator, in accordance with various embodiments.
Figure 3:
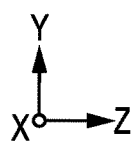

With reference to FIG. 3, aspirator 114 may include an aspirator body 130 coupled to an aspirator barrel 132 and to aspirator gas valve 120. Aspirator gas valve 120 may be coupled to pipe assembly 116, which may be coupled to compressed fluid source 118, which may comprise a charged cylinder. Fluid 119 from compressed fluid source 118 may travel through pipe assembly 116 and into aspirator 114 via aspirator gas valve 120.

Figure 4:
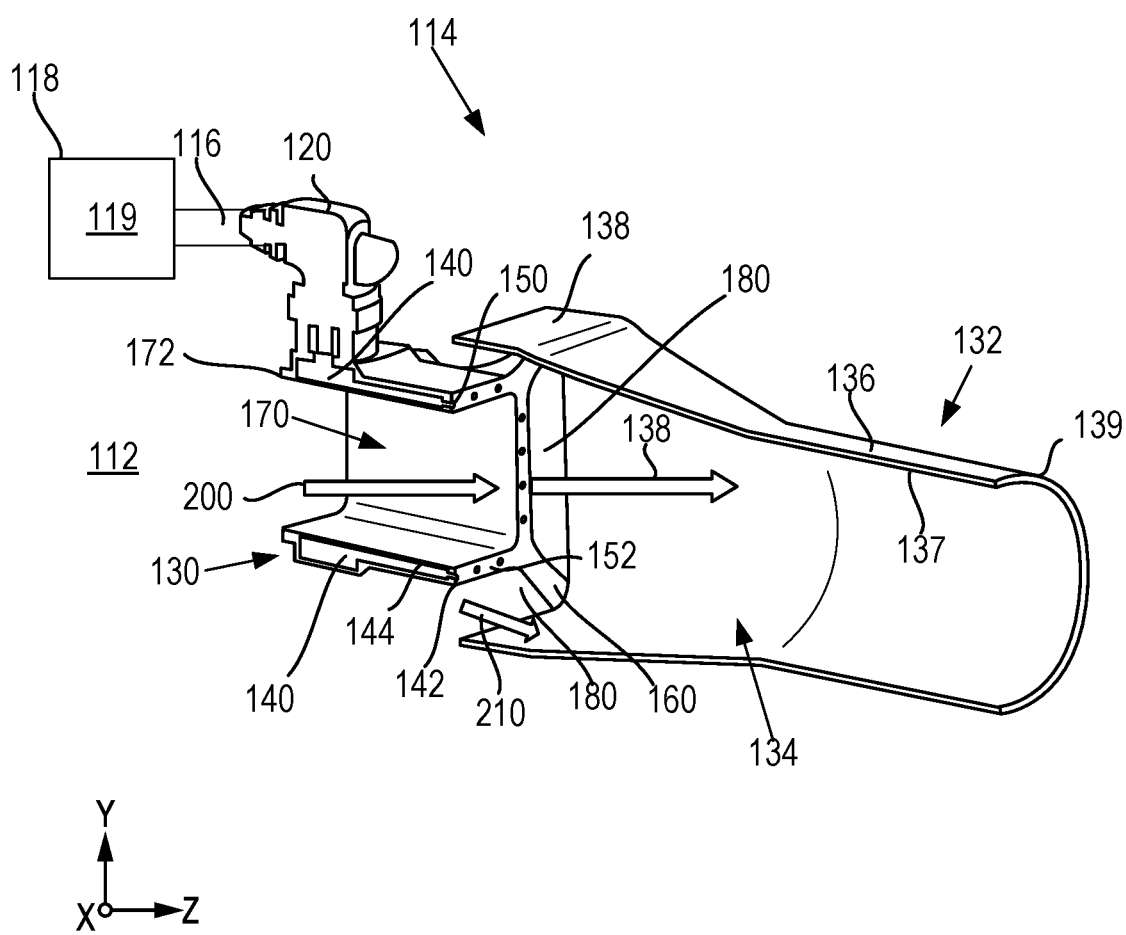
FIG. 4 illustrates a cross-sectional view of an aspirator, in accordance with various embodiments
Figure 5:
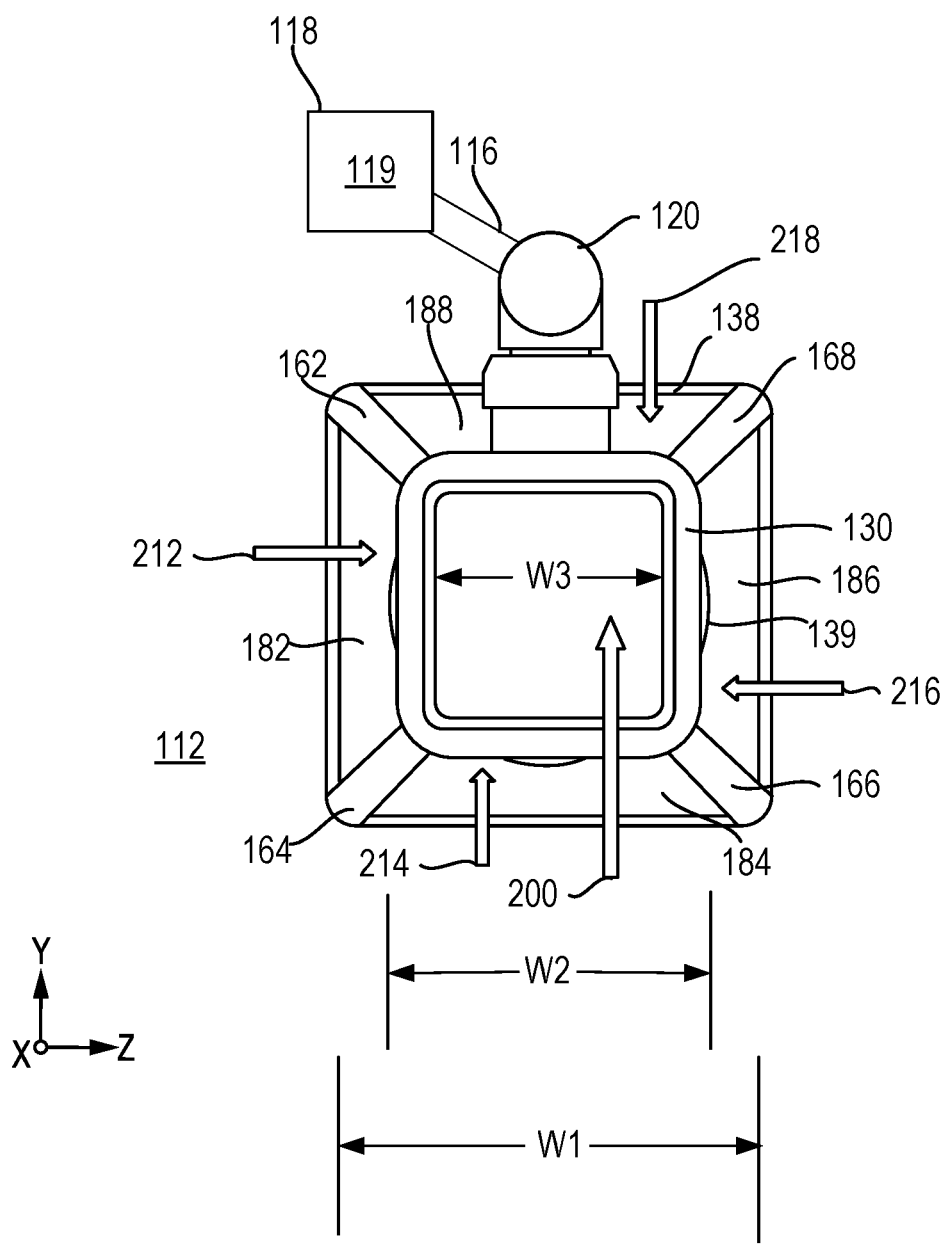
FIG. 5 illustrates an aspirator, in accordance with various embodiments.

With reference to FIGS. 4 and 5, aspirator barrel 132 may comprise barrel outer wall 136 and barrel inner wall 137. Aspirator barrel 132 may comprise air channel 134 disposed between first end 138 and second and 139 and defined by barrel inner wall 137. Width W1 of air channel 134 at first end 138 may be greater than width W2 of air channel 134 at second end 139. A smooth transition may bridge the first end 138 and the second end 139, resulting in a flow of at least one of fluid 119 or ambient gas 112 to be coupled to or adhere to the barrel inner wall 137, thereby avoiding pressure losses. Width W1 may be between about 3 inches (7.62 cm) to about 12 inches (30.48 cm). Width W1 may be 4.8 inches (12.19 cm) to about 8 inches (20.32 cm). Width W2 may be between about 2 inches (5.08 cm) to about 4.5 inches (11.43 cm). Width W2 may be about 3.5 inches (8.89 cm) to about to about 4 inches (10.16 cm). In this paragraph, "about" means+/−0.5 inches (1.27 cm).

Referring back to FIG. 4, aspirator body 130 may comprise plenum 140 disposed between outer wall 142 and inner wall 144 of aspirator body 130. Plenum 140 may extend between outer wall 142 and inner wall 144 throughout aspirator body 130. Aspirator body 130 may comprise an aperture 150 disposed between outer wall 142 and inner wall 144 of aspirator body 130. Aperture 150 may be defined by the area between side wall 152 and plenum 140. Aperture 150 may be in fluid communication with plenum 140.

Plenum 140 may be in fluid communication with pipe assembly 116, aspirator gas valve 120, and air channel 134, such that fluid 119 may flow from compressed fluid source 118 through aspirator gas valve 120 via pipe assembly 116 and into plenum 140. Fluid 119 may be directed from plenum 140 through aperture 150 into air channel 134 via first airflow path 138.

Figure 6A:
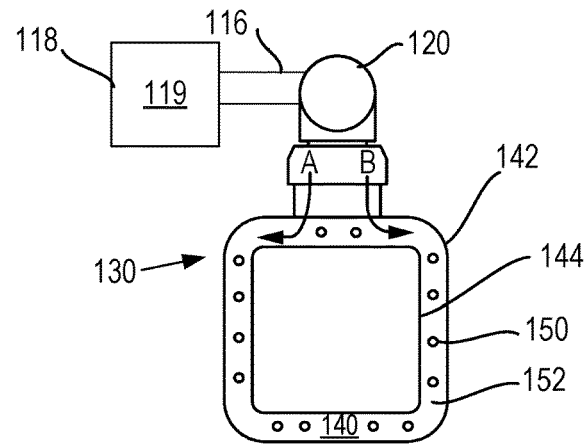
FIG. 6A illustrates an aspirator body, in accordance with various embodiments.
Figure 6B:
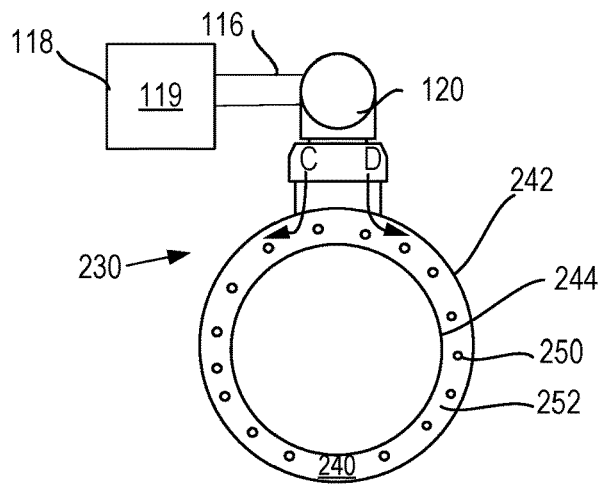
FIG. 6B illustrates an aspirator body, in accordance with various embodiments.
Figure 6C:
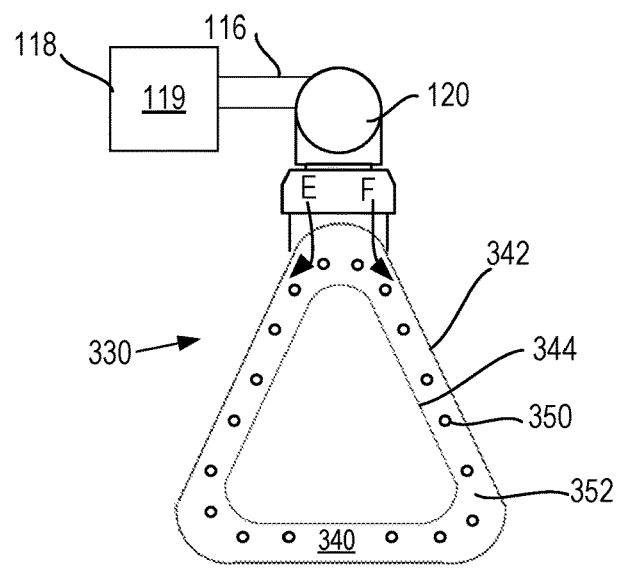
FIG. 6C illustrates an aspirator body, in accordance with various embodiments.

With reference to FIGS. 6A-6C, fluid 119, which may be high velocity gas, is directed from compressed fluid source 118 and through pipe assembly 116 and aspirator gas valve 120. Fluid 119 may be directed through aspirator gas valve 120 and enter the aspirator body 130 and fill plenum 140. Plenum 140 may comprise multiple pathways that extend distally to reach a plurality of apertures 150. For example, as shown in FIG. 6A, fluid 119 may be directed from 120 to apertures 150 via pathway A and pathway B. Multiple pathways allow for fluid 119 to be entrained by the entire plenum 140 and travel through multiple apertures 150. Aspirator body 130 may comprise a plurality of apertures 150, for example, in various embodiments at least sixteen apertures 150 disposed in various locations between inner wall 144 and side wall 152. It is contemplated that aspirator body 130 comprises any number of aperture 150 to facilitate passage of fluid 119 into aspirator barrel 132. The structure of the aspirator body 130 allows for a large surface area of fluid 119 traveling into air channel 134. Plenum 140 may self-regulate pressure of fluid 119 within plenum 140, leading to a decreased risk of over pressurization.

Fluid 119 may flow from plenum 140 through apertures 150 and into air channel 134. Aspirator body 130 may comprise body channel 170 defined by inner wall 144 and disposed between intake end 172 and side wall 152. In response to fluid 119 being directed from the compressed fluid source 118 through aperture 150 and into air channel 134, ambient gas 112 from the environment surrounding the aspirator 114 may be entrained into body channel 170 via second airflow path 200. Ambient gas 112 may be compelled through body channel 170 into air channel 134, and ultimately into inflatable evacuation device 110 (shown in FIGS. 2-3). Stated differently, aspirator 114 facilitates intake of ambient gas 112 from the environment, which enters body channel 170. The fluid 119 and ambient gas 112 may be directed into the inflatable evacuation device 110. In response to receiving the fluid 119 and ambient gas 112, inflatable evacuation device 110 may begin to inflate.

Aspirator 114 may comprise first secondary inlet 180 disposed between outer wall 142 of aspirator body 130 and barrel inner wall 137 of first end 138 of aspirator barrel 132. In response to fluid 119 moving from the compressed fluid source 118 through aperture 150 and into air channel 134, ambient gas 112 surrounding the aspirator 114 may be compelled through first secondary inlet 180 into air channel 134 via third airflow path 210. The first secondary inlet 180 may be in fluid communication with air channel 134. First secondary inlet 180 may entrain higher volume of ambient gas 112, which may help to increase the efficiency of aspirator 114. In this manner, the fluid 119 traveling into air channel 134 via apertures 150 may have a large surface area to better entrain ambient gas 112, which makes it more efficient. The ability of fluid 119 to travel to air channel 134 via the plurality of apertures 150 enables a greater amount of ambient gas 112 to be entrained through second airflow path 200 and third airflow path 210. The ability of ambient gas 112 to be directed through multiple airflow paths may result in less turbulence and more stability of the ambient gas 112 and fluid 119 within air channel 134.

Table 1 illustrates efficiency measurements of aspirator 114, at various back pressure parameters, wherein the efficiency measurement is the ratio of ambient air 112 entrained in aspirator 114 to the primary flow of fluid 119, and the back pressure is the pressure of the inflatable evacuation device 110:

TABLE 1

| Pump Inlet Pressure (psig) | Back Pressure (psig) | Efficiency |
| --- | --- | --- |
| 450 | 0 | 3.04 |
| 450 | 1 | 2.78 |
| 450 | 2 | 2.52 |
| 450 | 3 | 2.38 |

The increase in efficiency at all levels of back pressure may allow for a decrease in overall weight and volume of the aspirator body 130 and aspirator 114, thereby making the system more compact.

Referring back to FIG. 5, body channel 170 may have third width W3 of about 2 inches (5.08 cm) to about 4.5 inches (11.43 cm). Width W3 may be about 2.7 inches (6.86 cm) to about 3.5 inches (8.89 cm). In this paragraph, "about" means+/−0.5 inches (1.27 cm). In various embodiments, aspirator body 130 may comprise a quadrilateral, circular, or triangular cross section (see FIG. 6A-6C).

Aspirator body 130 may be coupled to aspirator barrel 132 via first bridge 160. Aspirator 114 may have more than one first bridge 160 connecting aspirator body 130 to aspirator barrel 132. Aspirator 114 may comprise, for example, two, three, or four positions at which first bridge 160 connects aspirator body 130 to aspirator barrel 132. Aspirator 114 may also have more than first secondary inlet 180 connecting aspirator body 130 to aspirator barrel 132. Aspirator 114 may also have a first secondary inlet 180 between each position that first bridge 160 connects aspirator body 130 to aspirator barrel 132.

For example, with reference to FIG. 5, aspirator 114 may comprise second secondary inlet 182 between second bridge 162 and third bridge 164, third secondary inlet 184 between third bridge 164 and fourth bridge 166, fourth secondary inlet 186 between fourth bridge 166 and fifth bridge 168, and fifth secondary inlet 188 between fifth bridge 168 and second bridge 162. Each of second bridge 162, third bridge 164, fourth bridge 166, and fifth bridge 168 may be identical to first bridge 160. Each of second secondary inlet 182, third secondary inlet 184, fourth secondary inlet 186, and fifth secondary inlet 188 may be identical to first bridge 160. In response to fluid 119 moving from the compressed fluid source 118 through aperture 150 and into air channel 134, ambient gas 112 surrounding the aspirator 114 may be compelled into air channel 134 through at least one of second secondary inlet 182 (via fourth airflow path 212), third secondary inlet 184 (via fifth airflow path 214), fourth secondary inlet 186 (via sixth airflow path 216), or fifth secondary inlet 188 (via seventh airflow path 218).

Referring to FIG. 6B, aspirator body 230 may comprise a circular or oval cross section. Aspirator body 230 may comprise plenum 240 and apertures 250 disposed between outer wall 242 and inner wall 244 of aspirator body 230. Aperture may be defined by the area between side wall 252 and plenum 240. Plenum 240 may be in fluid communication with pipe assembly 116, aspirator gas valve 120, and air channel 134 (shown in FIG. 4), such that fluid 119 may flow from compressed fluid source 118 through aspirator gas valve 120 via pipe assembly 116 and into plenum 240. Fluid 119 may be directed from 120 to apertures 250 via pathway C, and pathway D. Multiple pathways allow for fluid 119 to be entrained by the entire plenum 240 and travel through multiple apertures 250, allowing for a large surface area of fluid 119 traveling into air channel 134, and a larger surface area of ambient gas 112 being entrained into air channel 134.

Referring to FIG. 6C, aspirator body 330 may comprise a triangular cross section. Aspirator body 330 may comprise plenum 340 and apertures 350 disposed between outer wall 342 and inner wall 344 of aspirator body 330. Aperture may be defined by the area between side wall 352 and plenum 340. Plenum 340 may be in fluid communication with pipe assembly 116, aspirator gas valve 120, and air channel 134 (shown in FIG. 4), such that fluid 119 may flow from compressed fluid source 118 through aspirator gas valve 120 via pipe assembly 116 and into plenum 340. Fluid 119 may be directed from 120 to apertures 350 via pathway E and pathway F. Multiple pathways allow for fluid 119 to be entrained by the entire plenum 340 and travel through multiple apertures 350, allowing for a large surface area of fluid 119 traveling into air channel 134.

Figure 7:
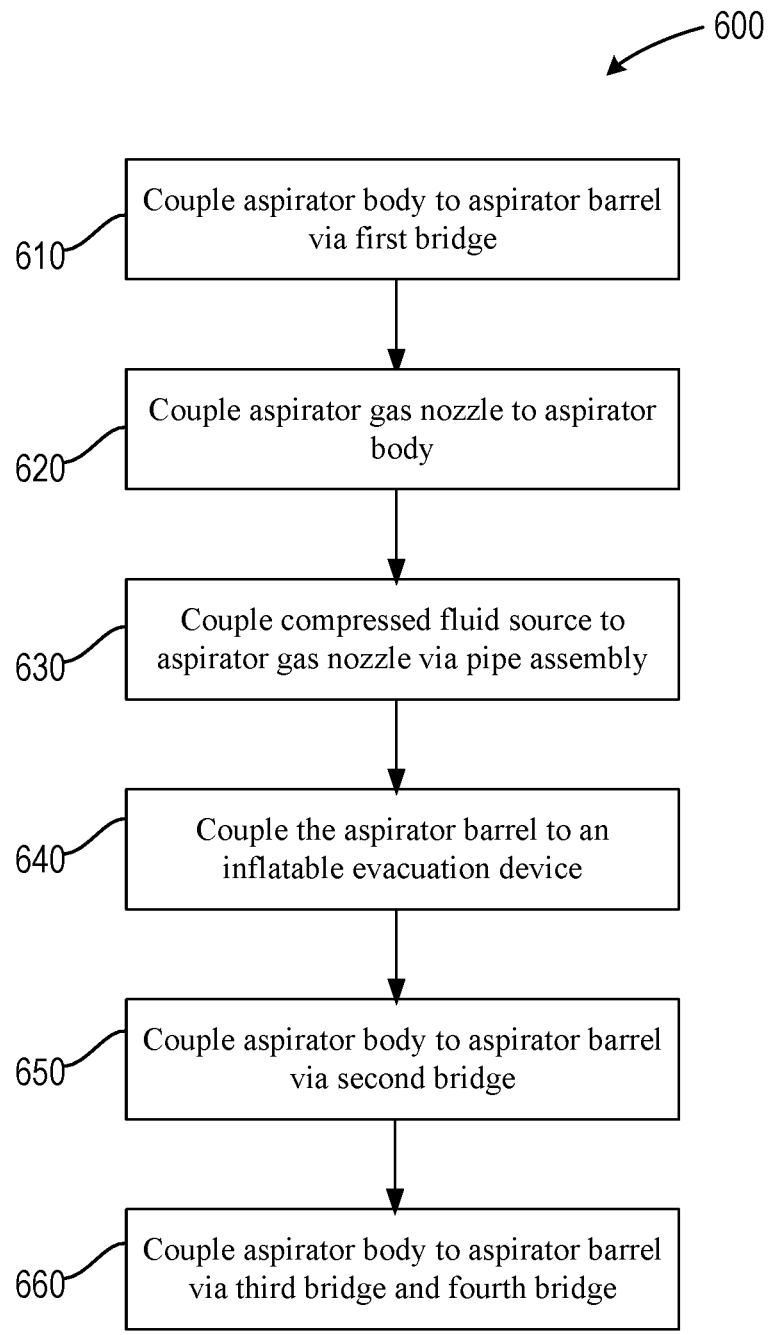
FIG. 7 illustrates an aspirator method, in accordance with various embodiments.

According to various embodiments, and in reference to FIG. 7, a method of assembling an aspirator 600 is provided. The aspirator method 600 may comprise coupling an aspirator body to an aspirator barrel via a first bridge (step 610). The method 600 may comprise coupling an aspirator gas valve to the aspirator body (step 620). The aspirator method 600 may comprise coupling a compressed fluid source to the aspirator gas valve via a pipe assembly (step 630). The aspirator method 600 may comprise coupling the aspirator barrel to an inflatable evacuation device (step 640). The aspirator method 600 may comprise coupling the aspirator body to the aspirator barrel via a second bridge (step 650). The aspirator method 600 may comprise coupling the aspirator body to the aspirator barrel via a third bridge and a fourth bridge (step 660).

Aspirator 114 may be comprised of a lightweight, rigid material, such as aluminum, anodized aluminum, polyamide or other plastic, composite, or other suitable material. Aspirator 114 may be formed by additive manufacturing, injection molding, composite fabrication, forging, casting, or other suitable process. As used herein, the term "additive manufacturing" encompasses any method or process whereby a three-dimensional object is produced by creation of a substrate or addition of material to an object, such as by addition of successive layers of a material to an object to produce a manufactured product having an increased mass or bulk at the end of the additive manufacturing process than the beginning of the process. A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, digital light processing, and cold spray. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, is intended to be included within the scope of the present disclosure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator, comprising:
   an aspirator body comprising an outer wall and an inner wall, the inner wall defining a body channel, wherein the aspirator body comprises a plenum disposed between the outer wall and the inner wall, wherein the aspirator body comprises a plurality of apertures disposed between the outer wall and the inner wall and defined by a side wall and the plenum, the plenum configured to receive a primary airflow therethrough, the body channel configured to receive a first secondary airflow therethrough; and
   an aspirator barrel comprising a barrel outer wall and a barrel inner wall, the barrel inner wall defining an air channel, wherein the air channel is in fluid communication with the plenum, wherein the body channel extends further upstream than the air channel further comprising a first secondary inlet disposed between the outer wall of the aspirator body and the barrel inner wall, wherein a second secondary airflow flows through the first secondary inlet into the air channel and wherein the primary airflow entrains the first secondary airflow and the second secondary airflow.

2. The aspirator of claim 1, further comprising a first bridge connecting the aspirator body to the aspirator barrel.

3. The aspirator of claim 1, wherein a width of the body channel is less than a width of the air channel at a first end of the aspirator barrel.

4. The aspirator of claim 1, wherein the aspirator body comprises at least one of a quadrilateral, circular, or triangular cross section.

5. The aspirator of claim 1, further comprising an inflatable evacuation device coupled with a second end of the aspirator barrel.

6. The aspirator of claim 3, wherein the width of the body channel is between 2 inches and 4.5 inches.

7. The aspirator of claim 3, wherein the width of the air channel at the first end of the aspirator barrel is between 3 inches and 12 inches, wherein a width of the air channel at a second end of the aspirator barrel is between 2 inches and 4.5 inches.

8. The aspirator of claim 1, further comprising a second secondary inlet disposed between the outer wall of the aspirator body and the barrel inner wall, wherein the second secondary inlet is in fluid communication with the air channel and wherein the primary airflow entrains a third secondary airflow from the second secondary inlet.

9. An aircraft having an evacuation system, the aircraft comprising:
   an aspirator coupled to an inflatable evacuation device; and
   a compressed fluid source coupled to the aspirator via a pipe assembly,
   wherein the aspirator comprises:
      an aspirator body comprising an outer wall and an inner wall, the inner wall defining a body channel, the aspirator body comprising a plenum disposed between the outer wall and the inner wall, the plenum in fluid communication with the compressed fluid source, the body channel in fluid communication with a secondary air source;
      an aspirator barrel comprising a barrel outer wall and a barrel inner wall, the barrel inner wall defining an air channel, the air channel in fluid communication with the body channel and the plenum;
      a first bridge connecting the aspirator body to the aspirator barrel; and
      a first secondary inlet disposed between the outer wall of the aspirator body and the barrel inner wall, wherein the first secondary inlet is in fluid communication with the air channel, wherein the body channel extends further upstream than the air channel and wherein compressed fluid from the compressed fluid source entrains airflow from the secondary air source which enters the air channel via both of the body channel and the first secondary inlet.

10. The aircraft of claim 9, wherein a width of the body channel is less than a width of the air channel at a first end of the aspirator barrel.

11. The aircraft of claim 9, wherein the aspirator body comprises a plurality of apertures disposed between the outer wall and the inner wall and defined by a side wall and the plenum.

12. The aircraft of claim 9, wherein the aspirator body comprises at least one of a quadrilateral, circular, or triangular cross section.

13. The aircraft of claim 9, further comprising a second secondary inlet disposed between the outer wall of the aspirator body and the barrel inner wall, wherein the second secondary inlet is in fluid communication with the air channel.

14. The aircraft of claim 13, further comprising a third secondary inlet disposed between the outer wall of the aspirator body and the barrel inner wall, wherein the third secondary inlet is in fluid communication with the air channel.

15. The aircraft of claim 10, wherein the width of the body channel is between 2 inches and 4.5 inches.

16. The aircraft of claim 10, wherein the width of the air channel at the first end of the aspirator barrel is between 3 inches and 12 inches.

17. A method of manufacturing an aspirator, comprising;
   coupling an aspirator body to an aspirator barrel via a first bridge, the aspirator body comprising an outer wall and an inner wall, the inner wall defining a body channel, wherein the aspirator body comprises a plenum disposed between the outer wall and the inner wall, the aspirator barrel comprising a barrel outer wall and a barrel inner wall, the barrel inner wall defining an air channel;
   coupling an aspirator gas valve to the aspirator body;
   coupling a compressed fluid source to the aspirator gas valve via a pipe assembly, the plenum in fluid communication with the compressed fluid source; and
   coupling the aspirator barrel to an inflatable evacuation device, wherein the body channel extends further upstream than the air channel wherein the plenum comprises at least one aperture in fluid communication with the air channel, and
   wherein a secondary inlet is disposed between the barrel inner wall and the outer wall of the aspirator such that the body channel and the secondary inlet are configured to receive air from a secondary source.

18. The aspirator method of claim 17, further comprising coupling the aspirator body to the aspirator barrel via a second bridge.

19. The aspirator method of claim 18, further comprising coupling the aspirator body to the aspirator barrel via a third bridge and a fourth bridge.

* * * * *